US012799428B2

(12) United States Patent
Qi et al.

(10) Patent No.: US 12,799,428 B2
(45) Date of Patent: Nov. 17, 2026

(54) OPACIFIER FOR DETERGENT FORMULATIONS

(71) Applicants: Dow Global Technologies LLC, Midland, MI (US); Rohm and Haas Company, Collegeville, PA (US)

(72) Inventors: Luqing Qi, Midland, MI (US); Aslin Izmitli, Yardley, PA (US); Ying O'Connor, Coatesville, PA (US); Michael Gysin, Bay City, MI (US); Yuanqiao Rao, Berwyn, PA (US); David L. Malotky, Midland, MI (US); Eric Wasserman, Collegeville, PA (US); Fanwen Zeng, Audubon, PA (US); Junsi Gu, Malvern, PA (US); Stephanie A. Bloxom, Midland, MI (US)

(73) Assignees: DOW GLOBAL TECHNOLOGIES LLC, Midland, MI (US); ROHM AND HAAS COMPANY, Collegeville, PA (US)

( * ) Notice: Subject to any disclaimer, the term of this patent is extended or adjusted under 35 U.S.C. 154(b) by 307 days.

(21) Appl. No.: 18/265,336

(22) PCT Filed: Dec. 2, 2021

(86) PCT No.: PCT/US2021/061509
§ 371 (c)(1),
(2) Date: Jun. 5, 2023

(87) PCT Pub. No.: WO2022/150123
PCT Pub. Date: Jul. 14, 2022

(65) Prior Publication Data

US 2024/0034957 A1 Feb. 1, 2024

Related U.S. Application Data

(60) Provisional application No. 63/134,711, filed on Jan. 7, 2021.

(51) Int. Cl.
*C11D 3/382* (2006.01)
*C11D 3/00* (2006.01)
(Continued)

(52) U.S. Cl.
CPC .......... *C11D 3/0089* (2013.01); *C11D 3/1213* (2013.01); *C11D 3/382* (2013.01);
(Continued)

(58) Field of Classification Search
CPC ..... C11D 3/0089; C11D 3/1213; C11D 3/382; C11D 17/0013; C11D 17/0039; C11D 2111/12
See application file for complete search history.

(56) References Cited

U.S. PATENT DOCUMENTS 4,579,716 A 4/1986 Krambeck et al.
5,190,650 A 3/1993 Tammera et al.
(Continued)

FOREIGN PATENT DOCUMENTS

BR 102015012999 A2 * 10/2018 ............. A61K 8/922
CA 3002411 A1 * 5/2017 ........... C11D 17/043
(Continued)

OTHER PUBLICATIONS

Gani, Siti Salwa, Basri, Mahiran, Kassim, Anuar, Rahman, Raja Noor Zaliha Raja Abd, Salleh, Abu Bakar, Ismail, Zahariah. "Characterization of Encapsulated Titanium Dioxide Using Engkabang Fat Esters for Cosmeceutical Purposes". IJPCBS. 4(3). 725-737. 2014 (Year: 2014).*
(Continued)

*Primary Examiner* — Angela C Brown-Pettigrew
*Assistant Examiner* — Brittany Sharon Harris
(74) *Attorney, Agent, or Firm* — CANTOR COLBURN LLP

(57) ABSTRACT

A fabric care formulation is provided, comprising: a liquid carrier; and a plurality of composite opacifier particles,
(Continued)

Figure 1:
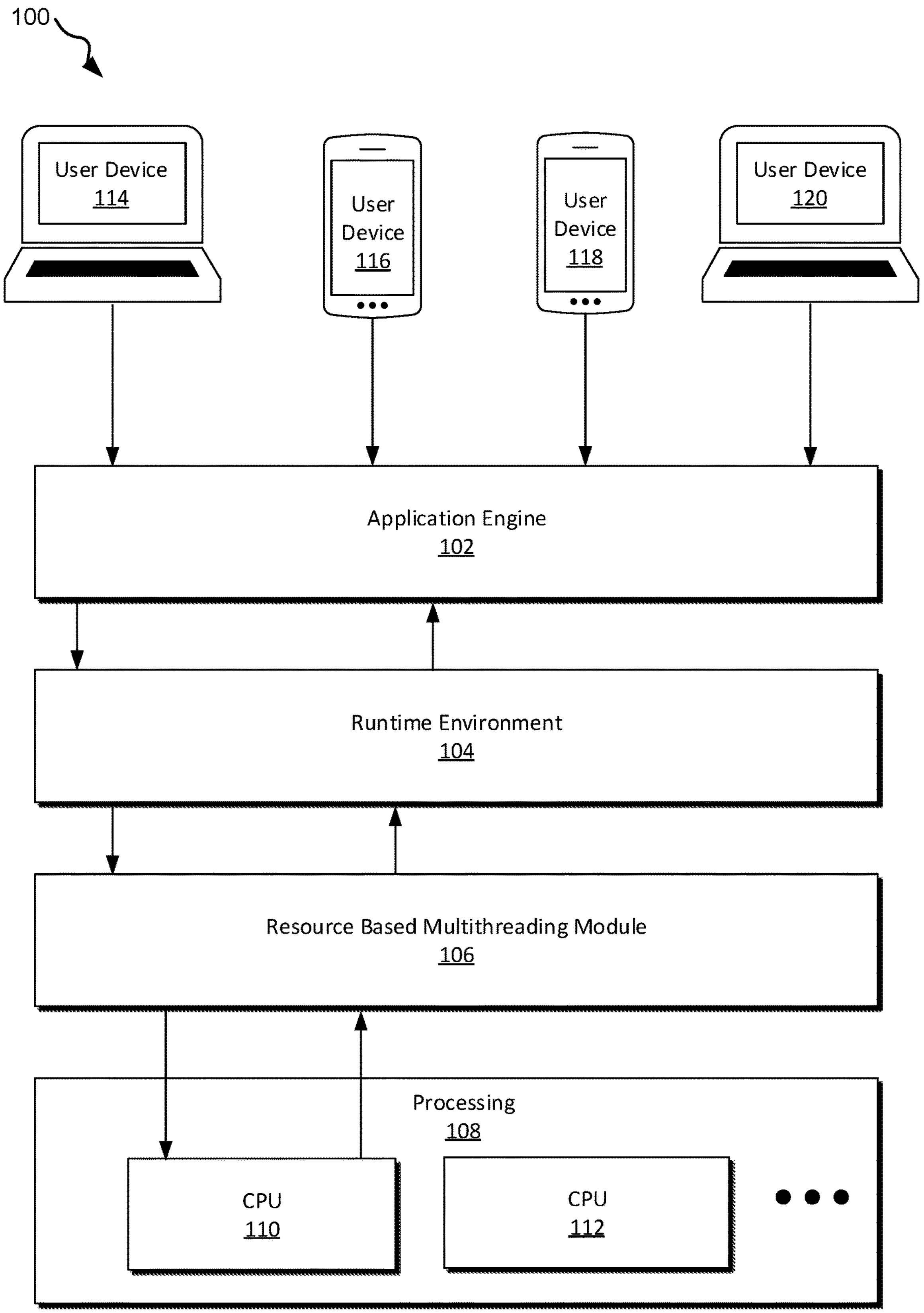
Figure 2:
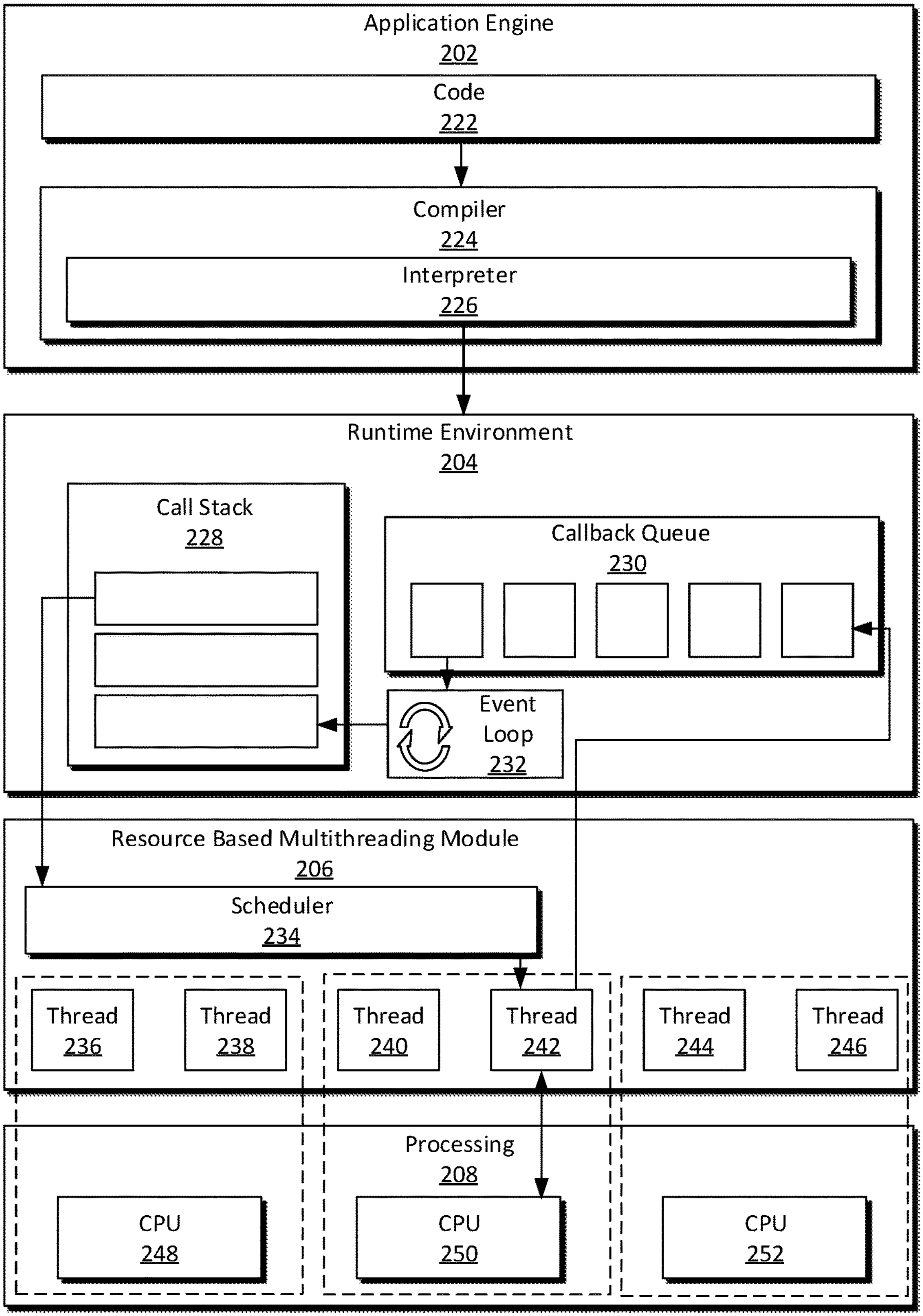
Figure 3:
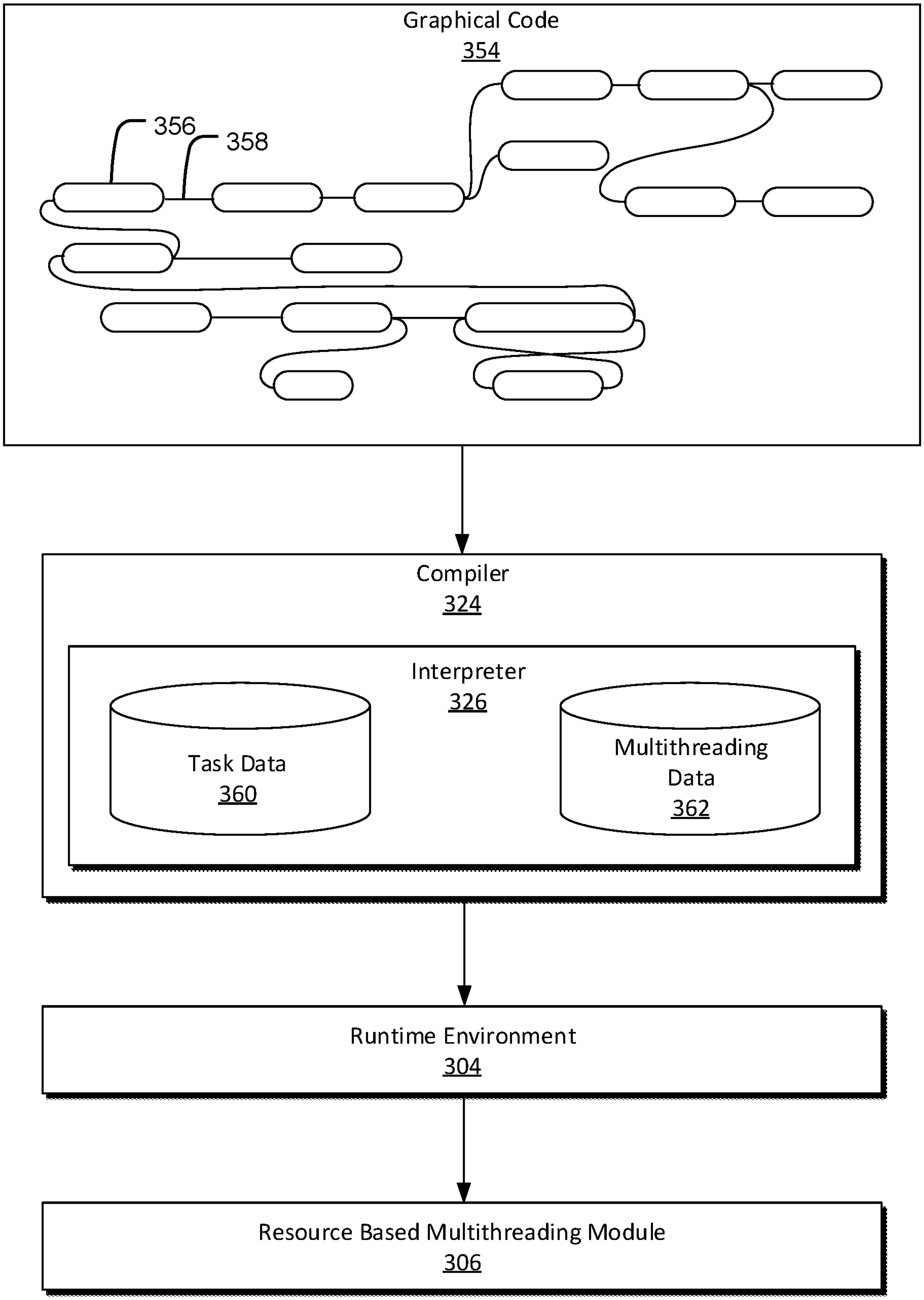
Figure 4:
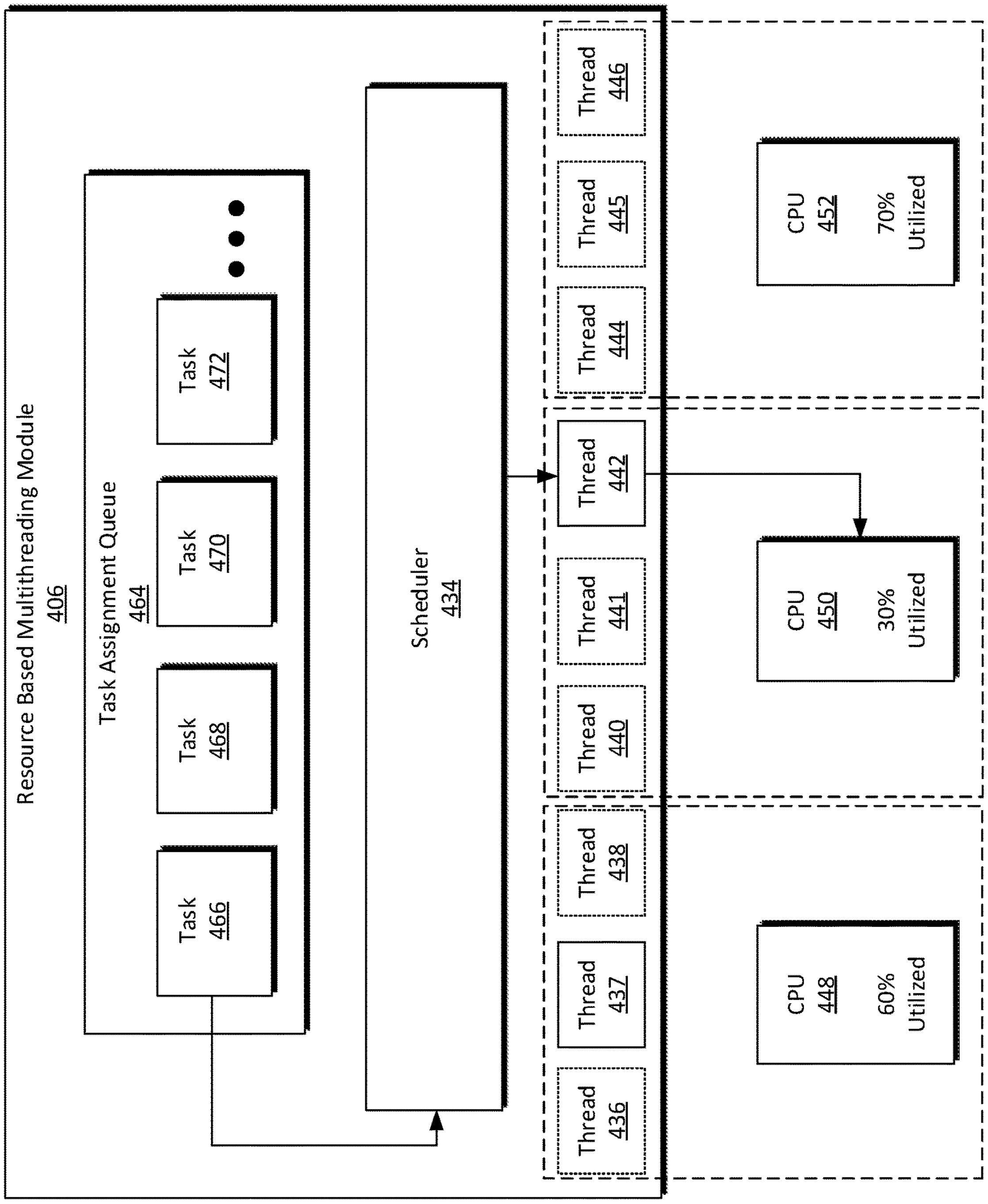
Figure 5:
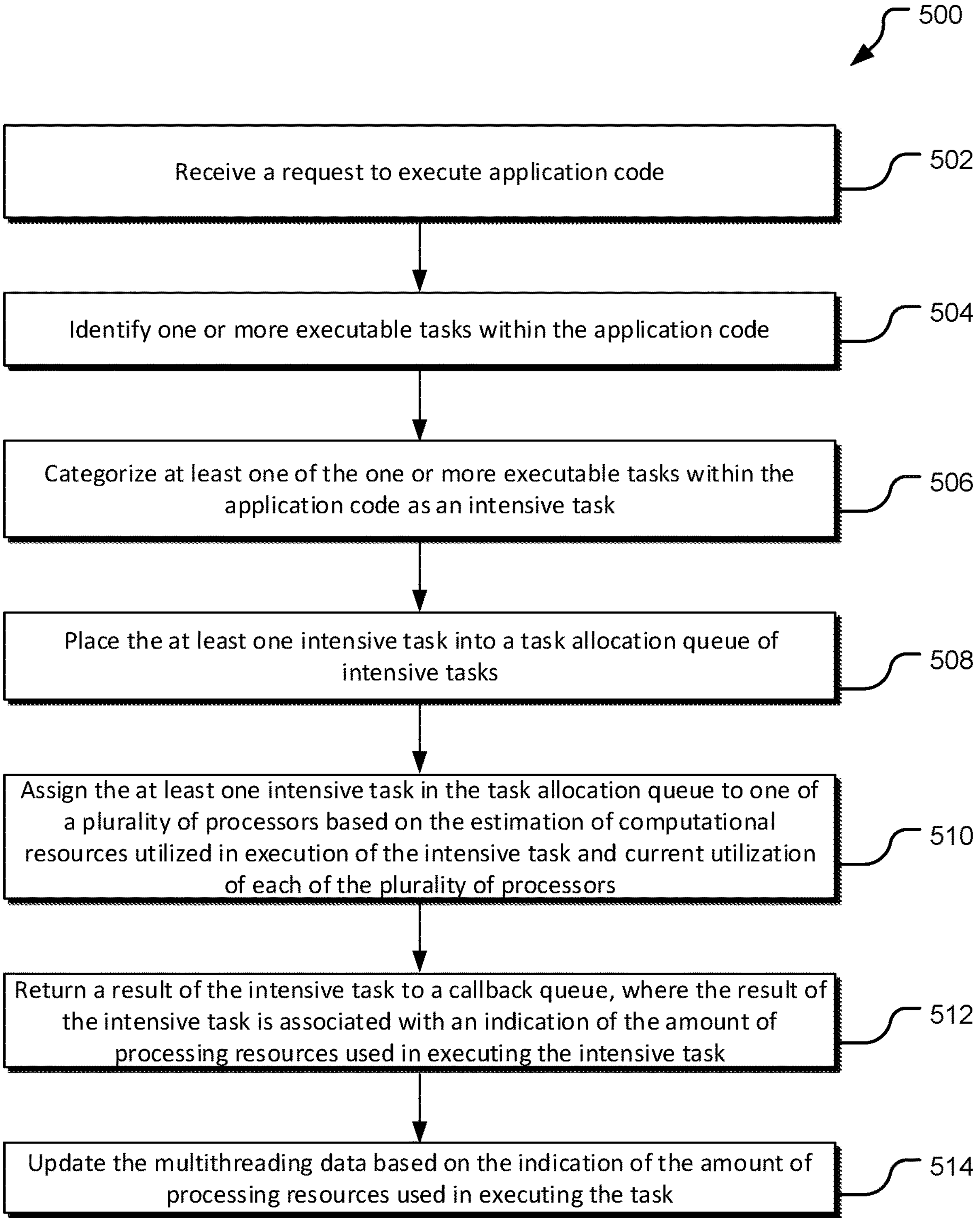
Figure 6:
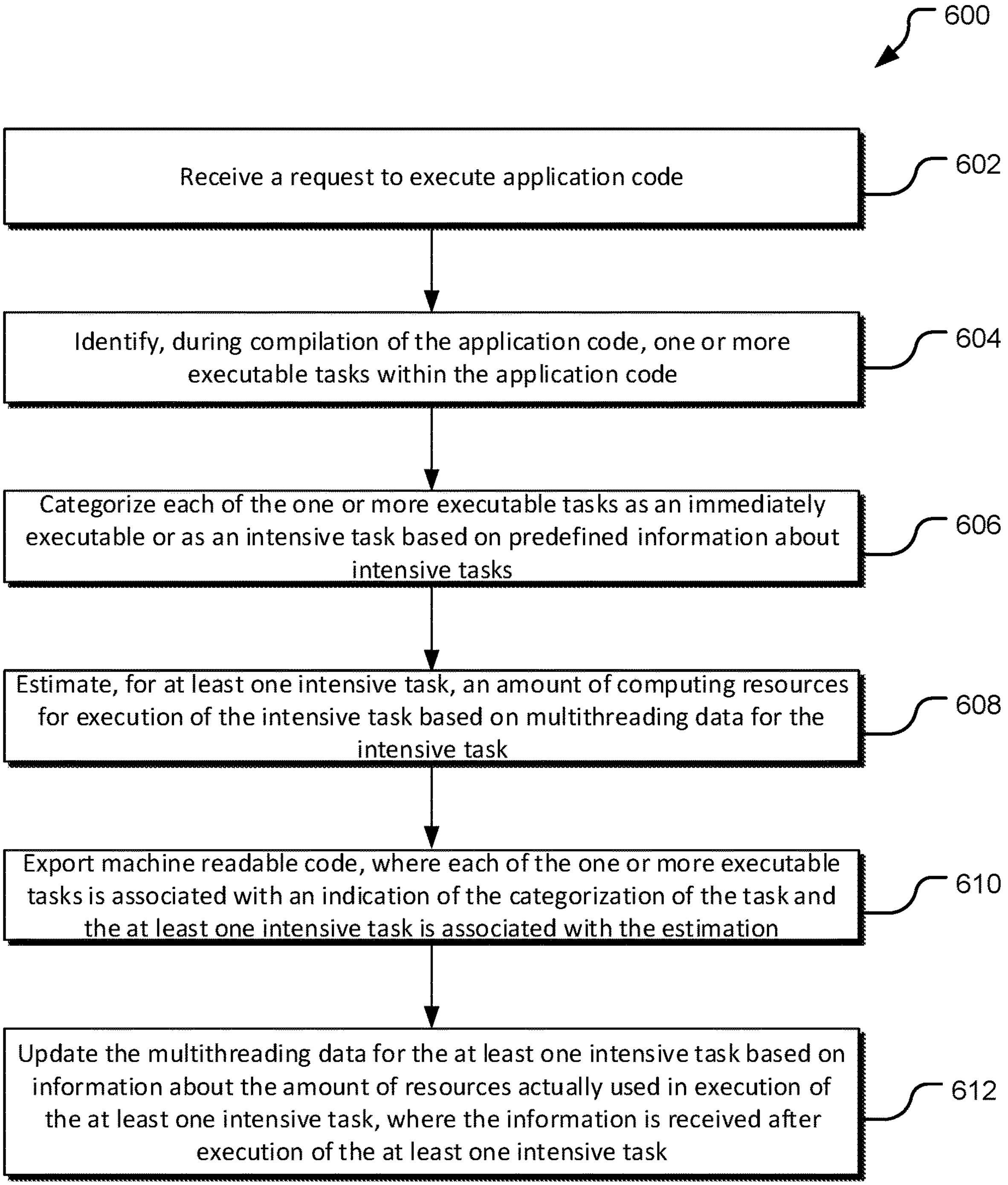
Figure 7:
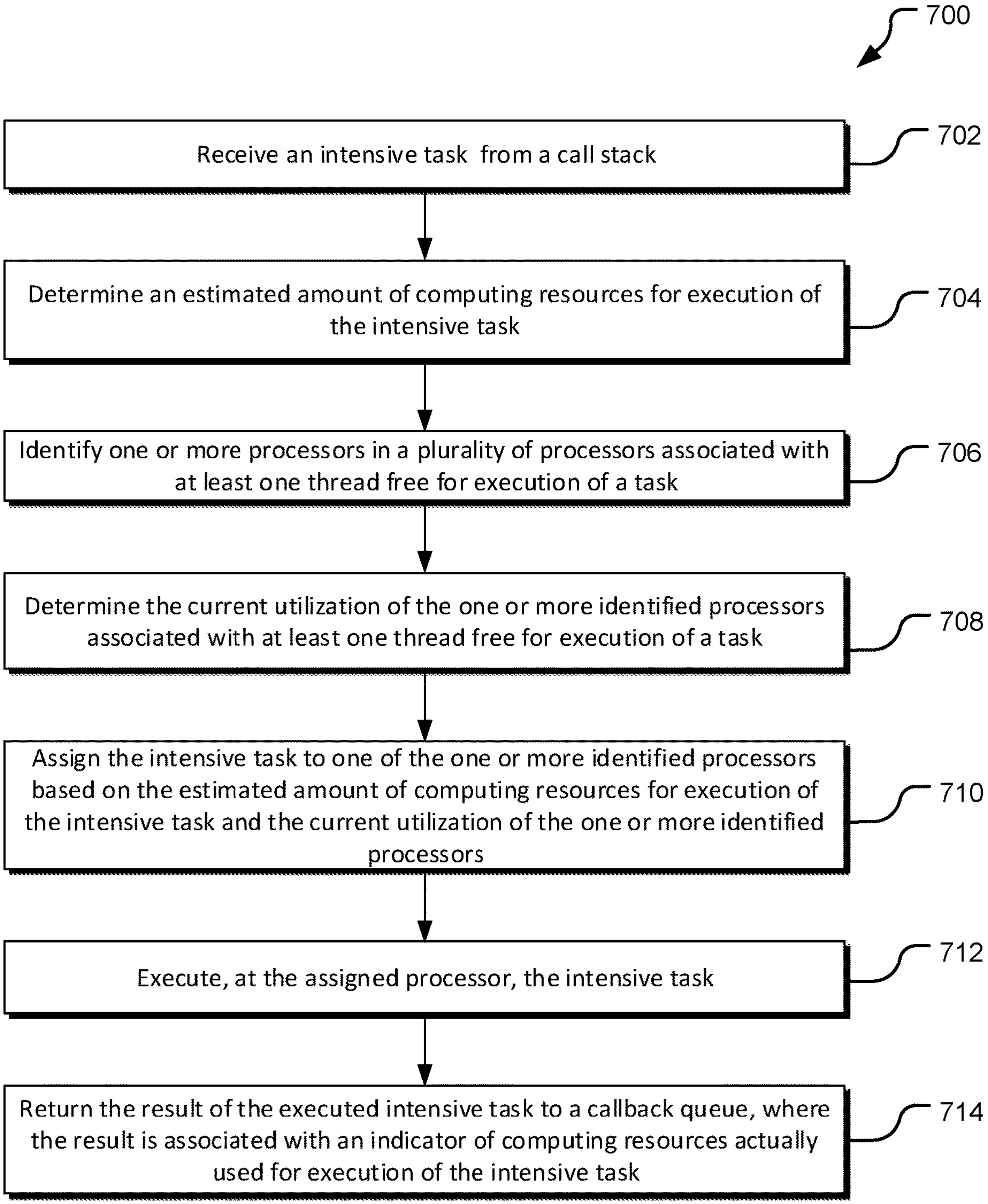
Figure 8:
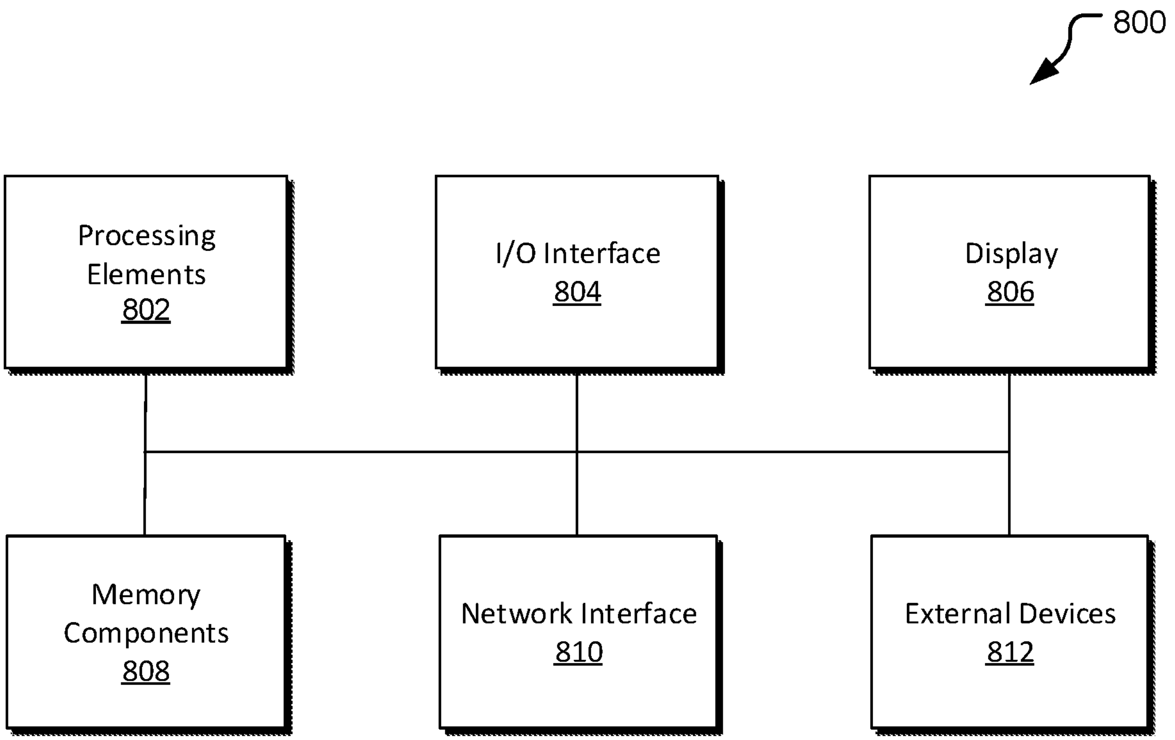

wherein the composite opacifier particles comprise metal oxide particles that are partially or completely encapsulated by a wax; wherein the metal oxide particles are selected from the group consisting of zinc oxide, titanium oxide and mixtures thereof; wherein the metal oxide particles have a z average particle size of >100 nm as measured by dynamic light scattering; wherein the wax has a melting point temperature of 45 to 110° C.; and wherein the composite opacifier particles have a z average particle size of >100 nm to 2,000 nm as measured by dynamic light scattering.

1 Claim, 8 Drawing Sheets

(51) Int. Cl.
*C11D 3/12* (2006.01)
*C11D 17/00* (2006.01)

(52) U.S. Cl.
CPC ...... *C11D 17/0013* (2013.01); *C11D 17/0039* (2013.01); *C11D 2111/12* (2024.01)

(56) References Cited

U.S. PATENT DOCUMENTS

| | | | |
|---|---|---|---|
| 5,275,641 A | | 1/1994 | Tammera et al. |
| 5,939,079 A | | 8/1999 | Le Royer et al. |
| 8,119,698 B2 | | 2/2012 | Polonka et al. |
| 8,669,406 B2 | | 3/2014 | Pretz et al. |
| 8,829,083 B2 | | 9/2014 | Lundgard et al. |
| 9,150,730 B2 | | 10/2015 | Nolte et al. |
| 9,517,190 B2 | | 12/2016 | Johncock et al. |
| 9,815,040 B2 | | 11/2017 | Pretz et al. |
| 9,827,543 B2 | | 11/2017 | Pretz et al. |
| 2005/0045031 A1 | | 3/2005 | Rajagopalan et al. |
| 2011/0195099 A1 | | 8/2011 | Nolte et al. |
| 2012/0077725 A1 | | 3/2012 | Wang et al. |
| 2018/0237729 A1 | * | 8/2018 | De Rose ............ C11D 3/38627 |
| 2018/0355290 A1 | | 12/2018 | Capeci et al. |

FOREIGN PATENT DOCUMENTS

| | | | | | |
|---|---|---|---|---|---|
| CA | 3081891 | A1 * | 9/2020 | ........... | C11D 3/2058 |
| CN | 110579120 | | 11/2020 | | |
| WO | WO-2005042828 | A2 * | 5/2005 | ............ | D06P 1/6426 |
| WO | 2020046978 | | 3/2020 | | |

OTHER PUBLICATIONS

Villalobos-Hernández. "Novel nanoparticulate carrier system based on carnauba wax and decyl oleate for the dispersion of inorganic sunscreens in aqueous media". Institut fur Pharmazeutische Technologie. 2005. (Year: 2005).*

Gani, "Characterization of encapsulated titanium dioxide using engkabang fat esters for cosmeceutical purposes", International Journal of Pharmaceutical, Chemical and Biological Sciences, 2014, vol. 4, No. 3, pp. 725-737.

* cited by examiner

OPACIFIER FOR DETERGENT FORMULATIONS

The present invention relates to a fabric care formulation. In particular, the present invention relates to a fabric care formulation, comprising: a liquid carrier; and a plurality of composite opacifier particles, wherein the composite opacifier particles comprise metal oxide particles that are partially or completely encapsulated by a wax; wherein the metal oxide particles are selected from the group consisting of zinc oxide, titanium oxide and mixtures thereof; wherein the metal oxide particles have a z average particle size of >100 nm as measured by dynamic light scattering; wherein the wax has a melting point temperature of 45 to 110° C.; and wherein the composite opacifier particles have a z average particle size of >100 nm to 2,000 nm as measured by dynamic light scattering.

In addition to cleaning performance, the aesthetic look and feel of a detergent is an important consideration for consumers. Thus, detergents typically contain a variety of ingredients that impact functionality, aesthetics, or both, including, for instance, surfactants, solvents, optional builder, and opacifiers.

Opacifiers are materials that make a liquid system opaque. Thus, opacifiers are used to modify the appearance or aesthetics of detergents, for instance, by transforming the liquid from clear or translucent to opaque. Opacifiers can provide a uniform, luxurious, "lotionized" appearance to a liquid product. Opacifiers are usually formed of submicron sized particles that are delivered to a formulation as a suspension of the particles in a solvent (typically water).

Since opacifiers are targeted to a formulation's aesthetics, it is generally desirable that their inclusion not interfere with the function of the formulation or otherwise negatively impact the formulation. For instance, opacifiers that exhibit limited compatibility with other materials in the formulation, have issues with stability, exhibit spotting or residue formation, are not favored. In addition, opacifiers that introduce large amounts of water into a formulation, e.g., by being effective only when used in large quantities, are also not favored, particularly for those formulations where limiting the quantity of water is desired, such as in concentrated detergents or unit dose packets.

There remains a need for more sustainable opacifiers for use detergent compositions; particularly wherein the sustainable opacifiers perform on par with conventional styrene acrylic copolymer based opacifiers.

The present invention provides a fabric care formulation comprising: a liquid carrier; and a plurality of composite opacifier particles, wherein the composite opacifier particles comprise metal oxide particles that are partially or completely encapsulated by a wax;

wherein the metal oxide particles are selected from the group consisting of zinc oxide, titanium oxide and mixtures thereof; wherein the metal oxide particles have a z average particle size of >100 nm as measured by dynamic light scattering; wherein the wax has a melting point temperature of 45 to 110° C.; and wherein the composite opacifier particles have a z average particle size of >100 nm to 2,000 nm as measured by dynamic light scattering.

The present invention provides a method of treating fabric comprising: providing a soiled fabric article; providing a wash water; providing a fabric care formulation according to claim 1; and applying the fabric care formulation to the soiled fabric article in the presence of the wash water to provide a cleaned fabric article.

DETAILED DESCRIPTION

We have surprisingly found that composite opacifier particles comprising metal oxide particles partially or completely encapsulated by a wax (preferably a natural wax) can be stably incorporated into liquid detergent formulations to provide opacification on par with conventional styrene acrylate copolymer based opacifiers, while increasing the overall sustainability of the liquid detergent formulations.

Unless otherwise indicated, ratios, percentages, parts, and the like are by weight.

As used herein, unless otherwise indicated, the phrase "molecular weight" or Mw refers to the weight average molecular weight as measured in a conventional manner with gel permeation chromatography (GPC) and poly(ethylene oxide) standards. GPC techniques are discussed in detail in Modern Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. Molecular weights are reported herein in units of Daltons, or equivalently, g/mol.

Preferably, the fabric care formulation of the present invention is selected from the group consisting of a laundry detergent formulation, a fabric softener formulation and a laundy refresher formulation. More preferably, the fabric care formulation of the present invention is a laundry detergent formulation. Most preferably, the fabric care formulation of the present invention is a liquid laundry detergent formulation.

Preferably, the fabric care formulation of the present invention, comprises: a liquid carrier (preferably, 25 to 97.9 wt % (more preferably, 50 to 94.5 wt %; still more preferably, 62.5 to 91.75 wt %; yet more preferably, 70 to 89.9 wt %; most preferably, 76 to 88 wt %), based on weight of the fabric care formulation, of the liquid carrier); and a plurality of composite opacifier particles (preferably, 0.05 to 10 wt % (more preferably, 0.1 to 7.5 wt %; still more preferably, 0.5 to 5 wt %; most preferably, 0.75 to 3.0 wt %, based on weight of the farbir care formulation, of the plurality of composite opacifier particles), wherein the composite opacifier particles comprise metal oxide particles that are partially or completely encapsulated by a wax; wherein the metal oxide particles are selected from the group consisting of zinc oxide, titanium oxide and mixtures thereof; wherein the metal oxide particles have a z average particle size of >100 nm (preferably, 110 nm to 500 nm; more preferably, 150 nm to 400 nm; most preferably, 175 to 275 nm) as measured by dynamic light scattering (e.g., with a Brookhaven particle size analyzer); wherein the wax has a melting point temperature of 45 to 110° C. (preferably, 65 to 100° C.; more preferably, 75 to 90° C.; most preferably, 80 to 90° C.); and wherein the composite opacifier particles have a z average particle size of >100 nm to 2,000 nm (preferably, 200 nm to 1,000 nm; more preferably, 250 nm to 750 nm; most preferably, 300 nm to 500 nm) as measured by dynamic light scattering (e.g., with a Beckman Coulter Particle Size Analyzer with a Universal Liquid Module).

Preferably, the fabric care formulation of the present invention, comprises a liquid carrier. More preferably, the fabric care formulation of the present invention comprises 25 to 97.9 wt % (preferably, 50 to 94.5 wt %; more preferably, 62.5 to 91.75 wt %; yet more preferably, 70 to 89.9 wt %; most preferably, 76 to 88 wt %), based on weight of the fabric care formulation, of a liquid carrier. Still more preferably, the fabric care formulation of the present invention comprises 25 to 97.9 wt % (preferably, 50 to 94.5 wt %; more preferably, 62.5 to 91.75 wt %; yet more preferably, 70 to 89.9 wt %; most preferably, 76 to 88 wt %), based on weight of the fabric care formulation, of a liquid carrier; wherein the liquid carrier comprises water. Most preferably, the fabric care formulation of the present invention comprises 25 to 97.9 wt % (preferably, 50 to 94.5 wt %; more preferably, 62.5 to 91.75 wt %; yet more preferably, 70 to 89.9 wt %; most preferably, 76 to 88 wt %), based on weight of the fabric care formulation, of a liquid carrier; wherein the liquid carrier is water.

Preferably, the liquid carrier can include water miscible liquids, such as, $C_{1-3}$ alkanolamines, $C_{1-3}$ alkanols and glycols. More preferably, the liquid carrier includes 0 to 8 wt % (preferably, 0.2 to 8 wt %; more preferably, 0.5 to 5 wt %), based on weight of the liquid carrier, of water miscible liquids; wherein the water miscible liquids are selected from the group consisting of $C_{1-3}$ alkanolamines, $C_{1-3}$ alkanols, propylene glycol and mixtures thereof. Most preferably, the liquid carrier includes 0 to 8 wt % (preferably, 0.2 to 8 wt %; more preferably, 0.5 to 5 wt %), based on weight of the liquid carrier, of a water miscible liquid; wherein the water miscible liquid is ethanol and propylene glycol.

Preferably, the fabric care formulation of the present invention comprises 0.05 to 10 wt % (preferably, 0.1 to 7.5 wt %; more preferably, 0.5 to 5 wt %; most preferably, 0.75 to 3 wt %), based on weight of the fabric care formulation, of a plurality of composite opacifier particles; wherein the composite opacifier particles comprises metal oxide particles that are partially or completely encapsulated (preferably, 50 to 100% encapsulated; more preferably, 75 to 100% encapsulated; most preferably, 90 to 100% encapsulated) by a wax; wherein the metal oxide particles are selected from the group consisting of zinc oxide, titanium oxide and mixtures thereof; wherein the metal oxide particles have a z average particle size of >100 nm (preferably, 110 nm to 500 nm; more preferably, 150 nm to 400 nm; most preferably, 175 to 275 nm) as measured by dynamic light scattering (e.g, with a Brookhaven particle size analyzer); wherein the wax has a melting point temperature of 45 to 110° C. (preferably, 65 to 100° C.; more preferably, 75 to 90° C.; most preferably, 80 to 90° C.); and wherein and wherein the composite opacifier particles have a z average particle size of >100 nm to 2,000 nm (preferably, 200 nm to 1,000 nm; more preferably, 250 nm to 750 nm; most preferably, 300 nm to 500 nm) as measured by dynamic light scattering (e.g., with a Beckman Coulter Particle Size Analyzer with a Universal Liquid Module). More preferably, the fabric care formulation of the present invention comprises 0.05 to 10 wt % (preferably, 0.1 to 7.5 wt %; more preferably, 0.5 to 5 wt %; most preferably, 0.75 to 3 wt %), based on weight of the fabric care formulation, of a plurality of composite opacifier particles; wherein the composite opacifier particles comprises metal oxide particles that are partially or completely encapsulated (preferably, 50 to 100% encapsulated; more preferably, 75 to 100% encapsulated; most preferably, 90 to 100% encapsulated) by a wax; wherein the composite opacifier particles comprise 1 to 40 wt % (preferably, 2 to 30 wt %; more preferably, 3 to 25 wt %; most preferably, 5 to 20 wt %), based on weight of the composite opacifier particles, of the metal oxide particles; wherein the metal oxide particles are selected from the group consisting of zinc oxide, titanium oxide and mixtures thereof; wherein the metal oxide particles have a z average particle size of >100 nm (preferably, 110 nm to 500 nm; more preferably, 150 nm to 400 nm; most preferably, 175 to 275 nm) as measured by dynamic light scattering (e.g, with a Brookhaven particle size analyzer); wherein the composite opacifier particles comprise 60 to 99 wt % (preferably, 70 to 98 wt %; more preferably, 75 to 97 wt %; most preferably, 80 to 95 wt %), based on weight of the composite opacifier particles, of a wax; wherein the wax has a melting point temperature of 45 to 110° C. (preferably, 65 to 100° C.; more preferably, 75 to 90° C.; most preferably, 80 to 90° C.); and wherein the composite opacifier particles have a z average particle size of >100 nm to 2,000 nm (preferably, 200 nm to 1,000 nm; more preferably, 250 nm to 750 nm; most preferably, 300 nm to 500 nm) as measured by dynamic light scattering (e.g., with a Beckman Coulter Particle Size Analyzer with a Universal Liquid Module). Most preferably, the fabric care formulation of the present invention comprises 0.05 to 10 wt % (preferably, 0.1 to 7.5 wt %; more preferably, 0.5 to 5 wt %; most preferably, 0.75 to 3 wt %), based on weight of the fabric care formulation, of a plurality of composite opacifier particles; wherein the composite opacifier particles comprises metal oxide particles that are partially or completely encapsulated (preferably, 50 to 100% encapsulated; more preferably, 75 to 100% encapsulated; most preferably, 90 to 100% encapsulated) by a wax; wherein the composite opacifier particles comprise 1 to 40 wt % (preferably, 2 to 30 wt %; more preferably, 3 to 25 wt %; most preferably, 5 to 20 wt %), based on weight of the composite opacifier particles, of the metal oxide particles; wherein the metal oxide particles are titanium oxide particles; wherein the titanium dioxide particles have a z average particle size of >100 nm (preferably, 110 nm to 500 nm; more preferably, 150 nm to 400 nm; most preferably, 175 to 275 nm) as measured by dynamic light scattering (e.g, with a Brookhaven particle size analyzer); wherein the composite opacifier particles comprise 60 to 99 wt % (preferably, 70 to 98 wt %; more preferably, 75 to 97 wt %; most preferably, 80 to 95 wt %), based on weight of the composite opacifier particles, of a wax; wherein the wax has a melting point temperature of 45 to 110° C. (preferably, 65 to 100° C.; more preferably, 75 to 90° C.; most preferably, 80 to 90° C.); and wherein and wherein the composite opacifier particles have a z average particle size of >100 nm to 2,000 nm (preferably, 200 nm to 1,000 nm; more preferably, 250 nm to 750 nm; most preferably, 300 nm to 500 nm) as measured by dynamic light scattering (e.g., with a Beckman Coulter Particle Size Analyzer with a Universal Liquid Module).

Preferably, the metal oxide particles are selected from the group consisting of zinc oxide, titanium oxide and mixtures thereof; wherein the metal oxide particles have a z average particle size of >100 nm (preferably, 110 nm to 500 nm; more preferably, 150 nm to 400 nm; most preferably, 175 to 275 nm) as measured by dynamic light scattering (e.g, with a Brookhaven particle size analyzer). More preferably, the metal oxide particles include titanium dioxide particles having a z average particle size of >100 nm (preferably, 110 nm to 500 nm; more preferably, 150 nm to 400 nm; most preferably, 175 to 275 nm) as measured by dynamic light scattering (e.g, with a Brookhaven particle size analyzer). Most preferably, the metal oxide particles are titanium dioxide particles having a z average particle size of >100 nm (preferably, 110 nm to 500 nm; more preferably, 150 nm to 400 nm; most preferably, 175 to 275 nm) as measured by dynamic light scattering (e.g, with a Brookhaven particle size analyzer). Preferably, the metal oxide particles have a hydrophobic surface treatment (e.g., a polysiloxane surface coating).

Preferably, the wax is a natural wax. More preferably, the wax is a natural wax selected from the group consisting of carnauba wax, candelilla wax, bayberry wax, castor wax, coco butter, esparto wax, laurel wax, japan wax, jojoba wax, ouricury wax, palm wax, rice bran wax, soy wax, shea butter, sunflower wax, tallow tree wax and mixtures thereof. More preferably, the wax is a natural wax selected from the group consisting of carnauba wax, castor wax, ouricury wax, rice bran wax and mixtures thereof. Still more preferably, the wax is a natural wax including carnauba wax. Most preferably, the wax is carnauba wax.

Preferably, the wax comprises $C_{23-31}$ paraffin, $C_{24-36}$ fatty alcohol, $C_{12-36}$ fatty acid and esters derived from $C_{9-24}$ fatty acids and $C_{12-36}$ fatty alcohols.

Preferably, the fabric care formulation of the present invention is a laundry detergent formulation, further comprising a cleaning surfactant. More preferably, the fabric care formulation of the present invention is a laundry detergent formulation, further comprising: 2 to 60 wt % (more preferably, 5 to 40 wt %; still more preferably, 7.5 to 30 wt %; yet more preferably, 10 to 25 wt %; most preferably, 10 to 20 wt %), based on weight of the fabric care formulation, of a cleaning surfactant. Still more preferably, the fabric care formulation of the present invention is a laundry detergent formulation, further comprising: 2 to 60 wt % (more preferably, 5 to 40 wt %; still more preferably, 7.5 to 30 wt %; yet more preferably, 10 to 25 wt %; most preferably, 10 to 20 wt %), based on weight of the fabric care formulation, of a cleaning surfactant; wherein the cleaning surfactant is selected from the group consisting of anionic surfactants, nonionic surfactants, cationic surfactants, amphoteric surfactants and mixtures thereof. Yet still more preferably, the fabric care formulation of the present invention is a laundry detergent formulation, further comprising: 2 to 60 wt % (more preferably, 5 to 40 wt %; still more preferably, 7.5 to 30 wt %; yet more preferably, 10 to 25 wt %; most preferably, 10 to 20 wt %), based on weight of the fabric care formulation, of a cleaning surfactant; wherein the cleaning surfactant is selected from the group consisting of a mixture including an anionic surfactant and a non-ionic surfactant. Most preferably, the fabric care formulation of the present invention is a laundry detergent formulation, further comprising: 2 to 60 wt % (more preferably, 5 to 40 wt %; still more preferably, 7.5 to 30 wt %; yet more preferably, 10 to 25 wt %; most preferably, 10 to 20 wt %), based on weight of the fabric care formulation, of a cleaning surfactant; wherein the cleaning surfactant includes a mixture of a linear alkyl benzene sulfonate, a sodium lauryl ethoxysulfate and a nonionic alcohol ethoxylate.

Anionic surfactants include alkyl sulfates, alkyl benzene sulfates, alkyl benzene sulfonic acids, alkyl benzene sulfonates, alkyl polyethoxy sulfates, alkoxylated alcohols, paraffin sulfonic acids, paraffin sulfonates, olefin sulfonic acids, olefin sulfonates, alpha-sulfocarboxylates, esters of alpha-sulfocarboxylates, alkyl glyceryl ether sulfonic acids, alkyl glyceryl ether sulfonates, sulfates of fatty acids, sulfonates of fatty acids, sulfonates of fatty acid esters, alkyl phenols, alkyl phenol polyethoxy ether sulfates, 2-acryloxy-alkane-1-sulfonic acid, 2-acryloxy-alkane-1-sulfonate, beta-alkyloxy alkane sulfonic acid, beta-alkyloxy alkane sulfonate, amine oxides and mixtures thereof. Preferred anionic surfactants include $C_{8-20}$ alkyl benzene sulfates, $C_{8-20}$ alkyl benzene sulfonic acid, $C_{8-20}$ alkyl benzene sulfonate, paraffin sulfonic acid, paraffin sulfonate, alpha-olefin sulfonic acid, alpha-olefin sulfonate, alkoxylated alcohols, $C_{8-20}$ alkyl phenols, amine oxides, sulfonates of fatty acids, sulfonates of fatty acid esters, $C_{8-10}$ alkyl polyethoxy sulfates and mixtures thereof. More preferred anionic surfactants include $C_{12-16}$ alkyl benzene sulfonic acid, $C_{12-16}$ alkyl benzene sulfonate, $C_{12-18}$ paraffin-sulfonic acid, $C_{12-18}$ paraffin-sulfonate, $C_{12-16}$ alkyl polyethoxy sulfate and mixtures thereof.

Non-ionic surfactants include alkoxylates (e.g., polyglycol ethers, fatty alcohol polyglycol ethers, alkylphenol polyglycol ethers, end group capped polyglycol ethers, mixed ethers, hydroxy mixed ethers, fatty acid polyglycol esters and mixtures thereof. Preferred non-ionic surfactants include fatty alcohol polyglycol ethers. More preferred non-ionic surfactants include secondary alcohol ethoxylates, ethoxylated 2-ethylhexanol, ethoxylated seed oils, butanol caped ethoxylated 2-ethylhexanol and mixtures thereof. Most preferred non-ionic surfactants include secondary alcohol ethoxylates.

Cationic surfactants include quaternary surface active compounds. Preferred cationic surfactants include quaternary surface active compounds having at least one of an ammonium group, a sulfonium group, a phosphonium group, an iodonium group and an arsonium group. More preferred cationic surfactants include at least one of a dialkyldimethylammonium chloride and alkyl dimethyl benzyl ammonium chloride. Still more preferred cationic surfactants include at least one of $C_{16-18}$ dialkyldimethylammonium chloride, a $C_{8-18}$ alkyl dimethyl benzyl ammonium chloride and dimethyl ditallow ammonium chloride. Most preferred cationic surfactant includes dimethyl ditallow ammonium chloride.

Amphoteric surfactants include betaines, amine oxides, alkylamidoalkylamines, alkyl-substituted amine oxides, acylated amino acids, derivatives of aliphatic quaternary ammonium compounds and mixtures thereof. Preferred amphoteric surfactants include derivatives of aliphatic quaternary ammonium compounds. More preferred amphoteric surfactants include derivatives of aliphatic quaternary ammonium compounds with a long chain group having 8 to 18 carbon atoms. Still more preferred amphoteric surfactants include at least one of $C_{12-14}$ alkyldimethylamine oxide, 3-(N,N-dimethyl-N-hexadecyl-ammonio) propane-1-sulfonate, 3-(N,N-dimethyl-N-hexadecylammonio)-2-hydroxypropane-1-sulfonate. Most preferred amphoteric surfactants include at least one of $C_{12-14}$ alkyldimethylamine oxide.

Preferably, the fabric care formulation of the present invention, optionally, further comprises at least one additional ingredient selected from the group consisting of an antimicrobial agent; a rheology modifier; a pH adjusting agent; a foaming agent; an emulsifying agent; a fragrance; a chelating agent; a preservative (e.g., benzoic acid, sorbic acid, phenoxyethanol); a bleaching agent; a bleaching activator; an anti-static agent; a structurant; a hydrotrope; a builder; a stabilizer; an enzyme; an optical brightener; a filler; a fabric softening agent; a colorant; an absorbent; a hard particle; a soft particle and mixtures thereof.

Preferably, the fabric care formulation of the present invention, optionally further comprises a hydrotrope. More preferably, the fabric care formulation of the present invention, optionally further comprises: 0 to 10 wt % (preferably, 0.1 to 7.5 wt %; more preferably, 0.2 to 5 wt %; most preferably, 0.5 to 2.5 wt %), based on the weight of the fabric care formulation, of a hydrotrope. More preferably, the fabric care formulation of the present invention, optionally further comprises: 0 to 10 wt % (preferably, 0.1 to 7.5 wt %; more preferably, 0.2 to 5 wt %; most preferably, 0.5 to 2.5 wt %), based on the weight of the fabric care formulation, of a hydrotrope; wherein the hydrotrope is selected from the group consisting of alkyl hydroxides; urea; monoethanolamine; diethanolamine; triethanolamine; calcium, sodium, potassium, ammonium and alkanol ammonium salts of xylene sulfonic acid, toluene sulfonic acid, ethylbenzene sulfonic acid, naphthalene sulfonic acid and cumene sulfonic acid; salts thereof and mixtures thereof. Most preferably, the fabric care formulation of the present invention, further comprises: 0 to 10 wt % (preferably, 0.1 to 7.5 wt %; more preferably, 0.2 to 5 wt %; most preferably, 0.5 to 2.5 wt %), based on the weight of the fabric care formulation, of a hydrotrope; wherein the hydrotrope is selected from the group consisting of sodium toluene sulfonate, potassium toluene sulfonate, sodium xylene sulfonate, ammonium xylene sulfonate, potassium xylene sulfonate, calcium xylene sulfonate, sodium cumene sulfonate, ammonium cumene sulfonate and mixtures thereof.

Preferably, the fabric care formulation of the present invention, optionally further comprises a fragrance. More preferably, the fabric care formulation of the present invention, optionally further comprises: 0 to 10 wt % (preferably, 0.001 to 5 wt %; more preferably, 0.005 to 3 wt %; most preferably, 0.01 to 2.5 wt %), based on the weight of the fabric care formulation, of a fragrance.

Preferably, the fabric care formulation of the present invention, optionally further comprises a builder. More preferably, the fabric care formulation of the present invention, optionally further comprises: 0 to 50 wt % (preferably, 5 to 50 wt %; more preferably, 7.5 to 30 wt %), based on the weight of the fabric care formulation, of a builder. Most preferably, the fabric care formulation of the present invention, optionally further comprises: 0 to 50 wt % (preferably, 5 to 50 wt %; more preferably, 7.5 to 30 wt %), based on the weight of the fabric care formulation, of a builder; wherein the builder is selected from the group consisting of inorganic builders (e.g., tripolyphosphate, pyrophosphate); alkali metal carbonates; borates; bicarbonates; hydroxides; zeolites; citrates (e.g., sodium citrate); polycarboxylates; monocarboxylates; aminotrismethylenephosphonic acid; salts of aminotrismethylenephosphonic acid; hydroxyethanediphosphonic acid; salts of hydroxyethanediphosphonic acid; diethylenetriaminepenta(methylenephosphonic acid); salts of diethylenetriaminepenta(methylenephosphonic acid); ethylenediaminetetraethylene-phosphonic acid; salts of ethylenediaminetetraethylene-phosphonic acid; oligomeric phosphonates; polymeric phosphonates; mixtures thereof.

Preferably, the fabric care formulation of the present invention, further comprises 0 to 10 wt %, based on weight of the fabric care formulation, of a bleaching agent. Preferred bleaching agents include, for example, sodium perborate and sodium percarbonate.

Preferably, the fabric care formulation of the present invention, further comprises 0 to 10 wt %, based on weight of the fabric care formulation, of a bleach activator. Preferred bleach activators include, for example, tetra acetyl ethylene diamine (TAED) and sodium nonanoyloxybenzene sulfonate (NOBS).

Preferably, the fabric care formulation of the present invention, further comprises 0 to 1 wt %, based on weight of the fabric care formulation, of a stabilizer. Preferred stabilizers include, for example, phosphonates.

Preferably, the fabric care formulation of the present invention, further comprises 0 to 2 wt %, based on weight of the fabric care formulation, of an enzyme. Preferred enzymes include, for example, protease, cellulase, amylase and lipase.

Preferably, the fabric care formulation of the present invention, further comprises 0 to 0.3 wt %, based on weight of the fabric care formulation, of an optical brightener. Preferred optical brighteners include, for example, fluorescent whitening agents.

Preferably, the fabric care formulation of the present invention, further comprises 0 to 74.09 wt % (preferably, 0.1 to 74.09 wt %; more preferably, 5 to 70 wt %; still more preferably, 28.5 to 65 wt %; most preferably, 53.9 to 62 wt %), based on weight of the fabric care formulation of a filler. More preferably, the fabric care formulation of the present invention, further comprises 0 to 74.09 wt % (preferably, 0.1 to 74.09 wt %; more preferably, 5 to 70 wt %; still more preferably, 28.5 to 65 wt %; most preferably, 53.9 to 62 wt %), based on weight of the fabric care formulation of a filler; wherein the filler includes at least one of sodium sulfate, sodium chloride, calcite and dolomite. Most preferably, the fabric care formulation of the present invention, further comprises 0 to 74.09 wt % (preferably, 0.1 to 74.09 wt %; more preferably, 5 to 70 wt %; still more preferably, 28.5 to 65 wt %; most preferably, 53.9 to 62 wt %), based on weight of the fabric care formulation of a filler; wherein the filler is selected from the group consisting of sodium sulfate, sodium chloride, calcite, dolomite and mixtures thereof.

Preferably, the fabric care formulation of the present invention, optionally further comprises a fabric softener. More preferably, the fabric care formulation of the present invention, optionally further comprises: 0 to 10 wt % (preferably, 0.5 to 10 wt %), based on the weight of the fabric care formulation, of a fabric softener. Most preferably, the fabric care formulation of the present invention, optionally further comprises: 0 to 10 wt % (preferably, 0.5 to 10 wt %), based on the weight of the fabric care formulation, of a fabric softener; wherein the fabric softener is a cationic coacervating polymer (e.g., cationic hydroxyl ethyl cellulose; polyquaternium polymers and combinations thereof).

Preferably, the fabric care formulation of the present invention, optionally further comprises a pH adjusting agent. More preferably, the fabric care formulation of the present invention, optionally further comprises a pH adjusting agent; wherein the fabric care formulation has a pH from 6 to 12.5 (preferably, 6.5 to 11; more preferably, 7.5 to 10). Bases for adjusting pH include mineral bases such as sodium hydroxide (including soda ash) and potassium hydroxide; sodium bicarbonate; sodium silicate; ammonium hydroxide; and organic bases (e.g., mono-, di- or tri-ethanolamine; and 2-dimethylamino-2-methyl-1-propanol (DMAMP)). Acids to adjust the pH include mineral acids (e.g., hydrochloric acid, phosphorus acid and sulfuric acid) and organic acids (e.g., acetic acid).

Preferably, the fabric care composition of the present invention, further comprises a rheology modifier. More preferably, the fabric care formulation of the present invention, further comprises a rheology modifier; wherein the rheology modifier is selected to increase the viscosity of the fabric care formulation (preferably without substantially modifying the other properties of the fabric care formulation). Most preferably, the fabric care formulation of the present invention, further comprises 0 to 10 wt % (preferably, 0.05 to 5 wt %; more preferably, 0.1 to 2.5 wt %; most preferably, 0.15 to 2.0 wt %), based on weight of the fabric care formulation, of a rheology modifier.

Preferably, the method of treating fabric of the present invention, comprises: providing a fabric article (preferably, a soiled fabric article); providing a fabric care formulation of the present invention; applying the fabric care formulation to the fabric article to provide a treated fabric article. More preferably, the method of treating fabric of the present invention, comprises: providing a soiled fabric article; providing a wash water; providing a fabric care formulation of the present invention; applying the fabric care formulation to the soiled fabric article in the presence of the wash water to provide a cleaned fabric article.

Some embodiments of the present invention will now be described in detail in the following Examples.

Comparative Examples CD1-CD4 and Example D1-D2: Dispersion

Dispersions were prepared in each of Comparative Example CD1-CD4 and Example D1-D2 by combining the components noted in TABLE 1 in a 300 mL Parr Mixing Vessel equipped with a Cowles mixer blade placed at the bottom of a 3.5 inch long stir shaft and a pulley system to allow mixer speeds up to 1,825 rpm. The wax, 30% potassium hydroxide solution, inorganic ingredient (if any) and the initial water noted in TABLE 1 were added to the Parr Mixing Vessel. The contents of the Parr Mixing Vessel were then heated with a heating mantle set at 140° C. Once the wax softended sufficiently, stirring was started at 150 rpm to facilitate even heating of the vessel contents. Once the vessel contents reached the process temperature of 140° C., the stirring speed was increased to 600 rpm. After 5 minutes, dilution water in the amount noted in TABLE 1 was added to the vessel. The heating mantle was lowered and the vessel contents were cooled to 50° C. via immersion of the vessel into a cool water bath, while maintaining the stirring speed at 600 rpm. The resulting dispersion product was tested for % solids, volume average particle size and pH.

TABLE 1

| | Ingredients (in g) | | | | | | | | | |
|---|---|---|---|---|---|---|---|---|---|---|
| | | 30% | Inorganic | | | Water | | % | PS | |
| Example | wax[1] | KOH | A[2] | B[3] | C[4] | Initial | Dilution | solids | (in nm) | pH |
| CD1 | 50.0 | 3.37 | — | — | — | 0 | 200 | 18.0 | 1,255* | 9.5 |
| CD2 | 50.0 | 3.37 | — | — | — | 6.63 | 200 | 20.0 | 282 | 9.5 |
| CD3 | 45.0 | 3.37 | 5.0 | — | — | 6.63 | 200 | 20.0 | 1,902* | 9.5 |
| CD4 | 45.0 | 3.37 | — | — | 5.0 | 6.63 | 200 | 20.0 | 3,750 | 9.5 |
| D1 | 45.0 | 3.37 | — | 5.0 | — | 6.63 | 200 | 20.0 | 388 | 9.5 |
| D2 | 42.5 | 3.37 | — | 7.5 | — | 6.63 | 200 | 20.0 | 397 | 9.5 |

[1]Carnauba wax ($C_{23-31}$ paraffin, $C_{24-36}$ fatty alcohol, $C_{12-36}$ fatty acid and esters of C9, $C_{12-36}$) available from Machado & CIA Inc.
[2]IMERCARE ® Opaque kaolin ($Al_2Si_2O_5(OH)_4$) having mean particle size of 600 nm available from Imerys Performance Minerals
[3]TI-PURE ™ R-104 $TiO_2$ mean particle size 220 nm with hydrophobic coating available from Chemours
[4]TI-PURE ™ R-101 $TiO_2$ mean particle size 290 nm with hydrophillic coating available from Chemours
*Multiple peaks observed

Comparative Examples $C_1$-$C_4$ and Example 1: Liquid Laundry Formulations

Liquid laundry formulations were prepared in each of Comparative Examples C1-C4 and Example 1 by combining the components in the amounts listed in TABLE 2.

TABLE 2

| | Example | | | | |
|---|---|---|---|---|---|
| Ingredient | C1 | C2 | C3 | C4 | 1 |
| Linear alkyl benzene sulfonate[1] | 10 | 10 | 10 | 10 | 10 |
| Sodium lauryl ethoxysulfate[2] | 4 | 4 | 4 | 4 | 4 |
| Nonionic alcohol ethoxylate[3] | 5 | 5 | 5 | 5 | 5 |
| Propylene glycol | 5 | 5 | 5 | 5 | 5 |
| Ethanol | 2 | 2 | 2 | 2 | 2 |
| Commercial Opacifier[4] | 0 | 0 | 1 | 0 | 0 |

TABLE 2-continued

| | Example | | | | |
|---|---|---|---|---|---|
| Ingredient | C1 | C2 | C3 | C4 | 1 |
| Product Example CD2 | 0 | 1 | 0 | 0.9 | 0 |
| Product Example D1 | 0 | 0 | 0 | 0 | 1 |
| $TiO_2$ particles[5] | 0 | 0 | 0 | 0.1 | 0 |
| Deionized Water | | | q.s. 100 | | |

[1]Nacconal 90G linear alkyl benzene sulfonate available from Stepan Company
[2]Steol CS-460 sodium lauryl ethoxysulfate available from Stepan Company
[3]Biosoft N25-7 nonionic alcohol ethoxylate available from Stepan Company
[4]OPULYN ™ 301 opacifier
[5]TI-PURE ™ R-104 $TiO_2$ particles with mean particle size of 220 nm and having a hydrophobic coating available from Chemours

Performance Testing

The formulation stability and opacity (L" value) of the body wash formulations from each of Comparative Examples C1-C4 and Example 1 are reported in TABLE 3. Each formulation was filled into a 1 mL vial and imaged by Dow PICA IIU High. Throughput (HTR) Imaging Station at room temperature. The image was analysed using Dow image Analysis Methods for HTR (DiamHTR) Version 2.0 in MATLAB. The analysis software was able to batch process images and integrate the whole area of sample image to calculate out the average L*a*b* color value for each sample. The calculated L*, a* and b* value for each sample is listed in TABLE 3.

TABLE 3

| Example | L* value | a* value | b* value | Formulation Stable |
|---|---|---|---|---|
| C1 | 9.00 | −0.03 | 0.01 | Yes |
| C2 | 63.5 | −1.42 | −1.45 | Yes |
| C3 | 84.5 | −1.19 | −1.61 | Yes |
| C4 | 86.6 | 0 | 2.83 | No |
| 1 | 83.6 | −0.52 | 2.27 | Yes |

The invention claimed is:

1. A laundry detergent formulation consisting of:

50 to 94.5 wt % of a liquid carrier;

5 to 40 wt % of a cleaning surfactant, wherein the cleaning surfactant includes a mixture of a linear alkyl benzene sulfonate, a sodium lauryl ethoxysulfate and a nonionic alcohol ethoxylate;

0.1 to 7.5 wt % of a hydrotrope;

0.1 to 7.5 wt % of a plurality of composite opacifier particles, wherein the composite opacifier particles comprise metal oxide particles that are partially or completely encapsulated by a natural wax; wherein the metal oxide particles are selected from the group consisting of zinc oxide, titanium oxide and mixtures thereof; wherein the metal oxide particles have a z average particle size of 175 to 275 nm as measured by dynamic light scattering; wherein the wax has a melting point temperature of 45 to 110° C.; wherein the natural wax is from the group consisting of carnauba wax, Candelilla wax, bayberry wax, castor wax, coco butter, esparto wax, Japan wax, jojoba wax, laurel wax, ouricury wax, palm wax, rice bran wax, soy wax, sunflower wax, shea butter, tallow tree wax and mixtures thereof; and wherein the composite opacifier particles have a z average particle size of 300 to 500 nm as measured by dynamic light scattering; and, optionally, one or more additional ingredient selected from the group consisting of an antimicrobial agent; a rheology modifier; a pH adjusting agent; a foaming agent; an emulsifying agent; a fragrance; a chelating agent; a preservative; a bleaching agent; a bleaching activator; an anti-static agent; a structurant; a builder; a stabilizer; an enzyme; an optical brightener; a filler; a fabric softening agent; a colorant; an absorbent; a hard particle; a soft particle and mixtures thereof.

* * * * *